(12) United States Patent
Park et al.

(10) Patent No.: US 9,276,414 B2
(45) Date of Patent: Mar. 1, 2016

(54) METHOD FOR TRANSMITTING SIGNALS FROM A PLURALITY OF WIRELESS POWER RECEIVERS TO WIRELESS POWER SUPPLIER

(75) Inventors: Sung-Kweon Park, Gyeonggi-do (KR); Ki Hyun Kim, Gyeonggi-do (KR); Kil-Soo Ko, Gyeonggi-do (KR); Kyung-Woo Lee, Gyeonggi-do (KR); Jin-Hyoung Park, Gangwon-do (KR)

(73) Assignee: Samsung Electronics Co., Ltd (KR)

( * ) Notice: Subject to any disclaimer, the term of this patent is extended or adjusted under 35 U.S.C. 154(b) by 777 days.

(21) Appl. No.: 13/608,730

(22) Filed: Sep. 10, 2012

(65) Prior Publication Data

US 2013/0063083 A1 Mar. 14, 2013

(30) Foreign Application Priority Data

Sep. 8, 2011 (KR) .................. 10-2011-0091491

(51) Int. Cl.
*H02J 7/00* (2006.01)
*H02J 7/02* (2006.01)
*H04B 5/00* (2006.01)

(52) U.S. Cl.
CPC .............. *H02J 7/0013* (2013.01); *H02J 7/025* (2013.01); *H02J 2007/0001* (2013.01); *H02J 2007/0096* (2013.01); *H04B 5/0031* (2013.01); *H04B 5/0037* (2013.01)

(58) Field of Classification Search
CPC ...................................................... H02J 7/025
USPC ........................................................ 320/108
See application file for complete search history.

(56) References Cited

U.S. PATENT DOCUMENTS

| 2009/0281678 A1 | 11/2009 | Wakamatsu |
| 2009/0322281 A1 | 12/2009 | Kamijo et al. |
| 2010/0034238 A1 | 2/2010 | Bennett |

(Continued)

FOREIGN PATENT DOCUMENTS

| EP | 2 284 849 | 2/2011 |
| EP | 2 325 037 | 5/2011 |

(Continued)

OTHER PUBLICATIONS

WPC_System_Description_ver.1.0 (84pgs).

(Continued)

*Primary Examiner* — Suresh Memula
(74) *Attorney, Agent, or Firm* — The Farrell Law Firm, P.C.

(57) ABSTRACT

Methods and apparatus are provided for transmission and reception of signals. A signal is received that includes at least one of a power supply signal for wireless charging from a wireless power supplier and a power communication signal from at least one external wireless power receiver. The received signal is analyzed to determine whether the power communication signal is included with the power supply signal in the received signal. A transmission frequency of a transmission signal is determined based on whether the power communication signal is included with the power supply signal in the received signal. Transmission data for control of the wireless charging is modulated, and the modulated transmission data is output as the transmission signal over the transmission frequency.

18 Claims, 8 Drawing Sheets

(56) References Cited

U.S. PATENT DOCUMENTS

| | | |
|---|---|---|
| 2010/0142423 A1 | 6/2010 | Zhu et al. |
| 2010/0181964 A1 | 7/2010 | Huggins et al. |
| 2011/0081857 A1 | 4/2011 | Lee et al. |
| 2012/0146577 A1* | 6/2012 | Tanabe ............... H02J 7/025 320/108 |
| 2012/0153893 A1* | 6/2012 | Schatz ............. B60L 11/182 320/108 |
| 2012/0326657 A1* | 12/2012 | Oettinger ............ H02J 7/025 320/108 |
| 2013/0063083 A1* | 3/2013 | Park ................. H02J 7/0013 320/108 |
| 2015/0008876 A1* | 1/2015 | Kwak ................ H02J 7/025 320/108 |
| 2015/0171931 A1* | 6/2015 | Won .................. H02J 5/005 320/108 |

FOREIGN PATENT DOCUMENTS

| | | |
|---|---|---|
| JP | 2009-278707 | 11/2009 |
| JP | 2010-035408 | 2/2010 |
| JP | 2010-141966 | 6/2010 |
| JP | 2011-072116 | 4/2011 |
| JP | 2010178473 | 8/2012 |
| JP | 2010187495 | 8/2012 |
| KR | 1020100017072 | 2/2010 |

OTHER PUBLICATIONS

European Search Report dated Dec. 9, 2015 issued in counterpart application No. 15191745.7-1804, 6 pages.

\* cited by examiner

METHOD FOR TRANSMITTING SIGNALS FROM A PLURALITY OF WIRELESS POWER RECEIVERS TO WIRELESS POWER SUPPLIER

PRIORITY

This application claims priority under 35 U.S.C. §119(a) to an application entitled "Method For Transmitting Signals From a Plurality Of Wireless Power Receivers to Wireless Power Supplier" filed in the Korean Intellectual Property Office on Sep. 8, 2011 and assigned Serial No. 10-2011-0091491, the contents of which are incorporated herein by reference.

BACKGROUND OF THE INVENTION

1. Field of the Invention

The present invention relates generally to wireless mobile terminals, and more particularly, to a method for charging a plurality of wireless power receivers using a single wireless power supplier.

2. Description of the Related Art

Mobile terminals, such as portable phones or Personal Digital Assistants (PDAs), are driven by a rechargeable battery. In order to charge the battery of the mobile terminal, a separate charger supplies electric energy to the battery. Typically, because respective contact terminals are provided on an exterior of both the charger and the battery, connectors between the contact terminals electrically connect the charger and the battery.

However, in the foregoing contact charging scheme, because the contact terminals are externally exposed, they may be easily contaminated, making it difficult to charge a battery. When the contact terminals are exposed to humidity, charging the battery cannot be normally performed.

Wireless or non-contact charging technology has been developed and applied to various electronic devices.

The wireless charging technology uses wireless power transmission and reception. For example, a wireless charging system is capable of automatically charging a battery when a portable phone is placed on a charging pad without being connected with a separate charging connector. In general, a wireless electric toothbrush and a wireless electric shaver are examples of wirelessly products that may be charged that are well known to ordinary persons. The wireless charging technology charges electronic devices in a wireless scheme to improve a water-resistance function. Because a wired charger is unnecessary, the portability of electronic devices is increased.

Examples of wireless charging technology include, for example, an electromagnetic induction scheme using a coil, and an RF/Micro Wave Radiation scheme for converting electric energy into a microwave and transferring the microwave.

Transmission of power over several meters has been accomplished using microwaves.

A power transmission scheme using electromagnetic induction refers to a scheme for transmitting power between a primary coil and a secondary coil. If a magnet is moved around a coil, an induction current is produced. An electric field is generated in a sending end and electric current is induced according to a change in the electric field to create energy. This is referred to as magnetic induction. The power transmission method using magnetic induction has excellent energy transmission efficiency.

An electromagnetic induction scheme has been used and applied to various devices. Most non-contact charging technologies used in conventional wireless charging are based on the electromagnetic induction scheme.

A system has been developed for transferring electric energy in a wireless scheme using a resonant type power transmission principle of a coupled mode theory as a resonant scheme, although it is spaced apart from a charger by several meters. This wireless charging system uses a physical concept of resonance meaning that, for example, a wine cup rings at the same vibration rate as a tuning fork oscillating beside the wine cup. An electromagnetic wave having electric energy is resonated instead of a sound. Because the resonated electric energy is directly transferred where there is a device having a resonant frequency, and a non-used part is spread to air but is again absorbed in an electronic field, it does not affect peripheral machines or persons, unlike an electromagnetic wave.

A wave radiation scheme is a power transmission scheme that converts power energy into a microwave beneficial to wireless transmission and energy transfer. Unlike a signal used in a wireless communication scheme, such as a radio or a wireless phone, the wave radiation scheme sends electric energy. A signal is loaded in a carrier wave and the carrier wave is sent in a general communication scheme.

In the foregoing wireless power transmission system, for efficient power transmission, communication may be performed between a wireless power supplier and a wireless power receiver. Conventionally, power from the wireless power supplier is supplied to the wireless power receiver, and the wireless power receiver unilaterally transmits a power communication signal capable of controlling an amount of supplied power to a wireless power device.

However, when there are a plurality of wireless power receivers, if respective wireless power receivers transmit a transmission signal in one direction, respective frequencies of the power communication signals collide preventing the ability to smoothly charge.

SUMMARY OF THE INVENTION

The present invention has been made to address at least the above problems and/or disadvantages and to provide at least the advantages described below. Accordingly, an aspect of the present invention provides a wireless power receiver for transmitting a transmission signal, for controlling power supplied from a wireless power supplier, to the wireless power receiver using different frequencies when a plurality of wireless power receivers transmit the transmission signal to a single wireless power supplier.

In accordance with an aspect of the present invention, a method of transmitting a signal from a wireless power receiver is provided. A signal is received that includes at least one of a power supply signal for wireless charging from a wireless power supplier and a power communication signal from at least one external wireless power receiver. The received signal is analyzed to determine whether the power communication signal is included with the power supply signal in the received signal. A transmission frequency of a transmission signal is determined based on whether the power communication signal is included with the power supply signal in the received signal. Transmission data for control of the wireless charging is modulated, and the modulated transmission data is output as the transmission signal over the transmission frequency.

In accordance with another aspect of the present invention, a method of receiving a signal at a wireless power supplier is provided. A signal is received that includes one or more power communication signals with different frequencies from at least one wireless power receiver. The received signal is demultiplexed into the one or more power communication signals with different frequencies. The one or more power communication signals are demodulated into power communication data. The power communication data is analyzed to control and supply wireless power to the at least one wireless power receiver.

In accordance with a further another aspect of the present invention, a wireless power receiver is provided. The wireless power receiver includes a communication unit for receiving a signal including at least one of a power supply signal for wireless charging from a wireless power supplier and a power communication signal from at least one external wireless power receiver. The wireless power receiver also includes a controller for analyzing the received signal to determine whether the power communication signal is included with the power supply signal in the received signal, and determining a transmission frequency of a transmission signal based on whether the power communication signal is included with the power supply signal in the received signal. The wireless power receiver further includes a transmission signal generator for modulating transmission data for control of the wireless charging, and outputting the modulated transmission data as the transmission signal for the transmission frequency to the communication unit. The controller controls the communication unit to transmit the input transmission signal.

In accordance with an additional aspect of the present invention, a wireless power supplier is provided. The wireless power supplier includes a power supply unit for supplying power to at least one wireless power receiver. The wireless power supplier also includes a communication unit for receiving a signal including one or more power communication signals with different frequencies from the at least one wireless power receiver. The wireless power supplier further includes a demultiplexer for demultiplexing the received signal into the one or more power communication signals with different frequencies. The wireless power supplier additionally includes a controller for demodulating the one or more power communication signals into power communication data, and analyzing the power communication data to control and supply wireless power to the at least one wireless power receiver.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
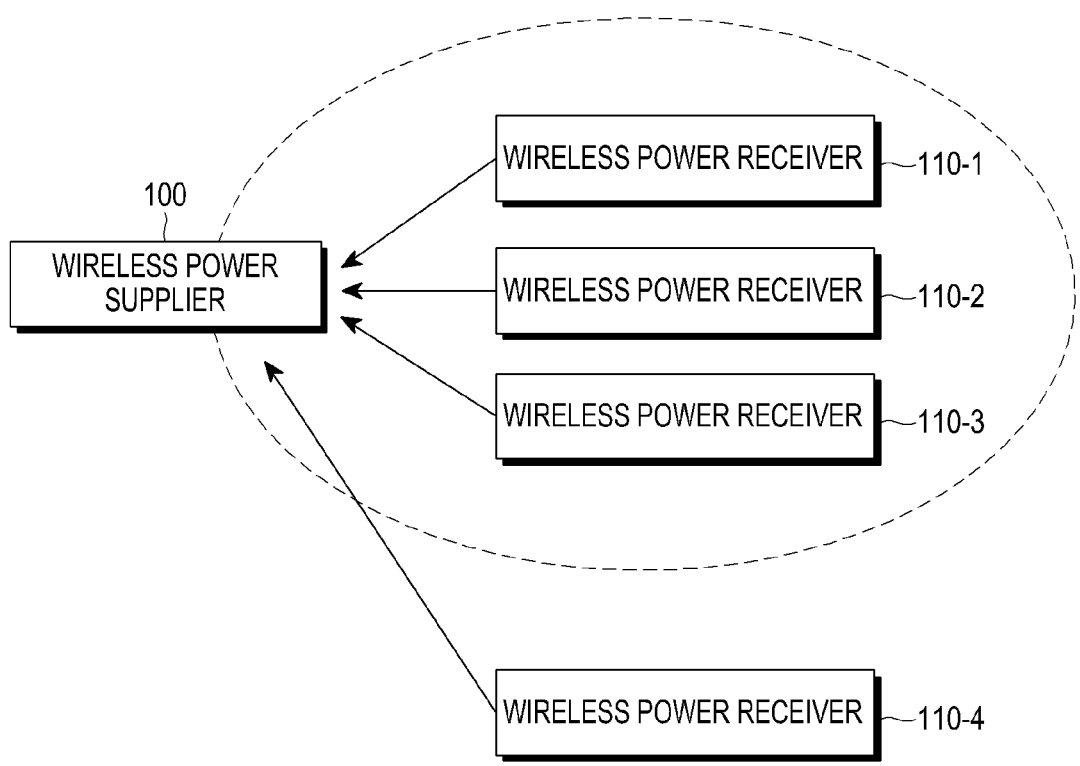
FIG. 1 is a diagram illustrating a wireless power transmission/reception system, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a diagram illustrating a wireless power transmission/reception system, according to an embodiment of the present invention. As shown in FIG. 1, the wireless power transmission/reception system includes a wireless power supplier 100 and wireless power receivers 110-1, 110-2, 110-3, and 110-4. The wireless power supplier 100 is electrically connected with the wireless power receivers 110-1, 110-2, 110-3, and 110-4. In an embodiment of the present invention, the wireless power supplier 100 supplies wireless power to the wireless power receivers 110-1, 110-2, and 110-3 in the form of an electromagnetic wave. Each of the wireless power receivers 110-1, 110-2, and 110-3 unilaterally transmits a predetermined signal to the wireless power supplier 100.

The wireless power receivers 110-1, 110-2, 110-3, and 110-4 are devices that can process or transmit/receive a predetermined communication packet. For example, the wireless power receivers 110-1, 110-2, 110-3, and 110-4 may be embodied as a portable phone, a PDA, a PMP, or a smart phone.

The wireless power supplier 100 provides power to the plurality of wireless power receivers 110-1, 110-2 and 110-3 in a wireless scheme. For example, the wireless power supplier 100 transmits power to the plurality of wireless power receivers 110-1, 110-2, and 110-3 in a resonant scheme. When the wireless power supplier 100 uses the resonant scheme, the distance between the wireless power supplier 100 and each of the plurality of wireless power receivers 110-1, 110-2, and 110-3 is preferably less than or equal to 30 m. When the wireless power supplier 100 uses the electromagnetic induction scheme, the distance between the wireless power supplier 100 and each of the plurality of wireless power receivers 110-1, 110-2, and 110-3 is preferably less than or equal to 10 cm. In an embodiment of the present invention, the wireless power receiver 110-4 may not be located within the prescribed distance. Accordingly, as the wireless power receiver 110-4 is located beyond a wireless power supply range, it cannot receiver wireless power.

The wireless power receivers 110-1, 110-2, and 110-3 receive wireless power from the wireless power supplier 100 to charge a battery provided therein. Further, the wireless power receivers 110-1, 110-2, and 110-3 transmit a signal requesting transmission of wireless power, information necessary for reception of the wireless power, state information of a wireless power receiver, or control information of the wireless power supplier 100, to the wireless power supplier 100. Information of the transmission signal is described in greater detail below.

The wireless power receivers 110-1, 110-2, and 110-3 transmit a location information message. The location information message of the wireless power receivers 110-1, 110-2, and 110-3 may be implemented by Near Field Communication (NFC), such as, for example, an RF signal or Bluetooth communication.

Further, the wireless power receivers 110-1, 110-2, and 110-3 transmit respective charging state messages indicating respective charging states to the wireless power supplier 100.

The wireless power supplier 100 includes a display means such as a display device. The wireless power supplier 100 expresses respective states of the wireless power receivers 110-1, 110-2, and 110-3 based on respective messages received from the wireless power receivers 110-1, 110-2, and 110-3. Moreover, the wireless power supplier 100 expresses a time expected until a charging completion time of the wireless power receivers 110-1, 110-2, and 110-3.

Figure 2:
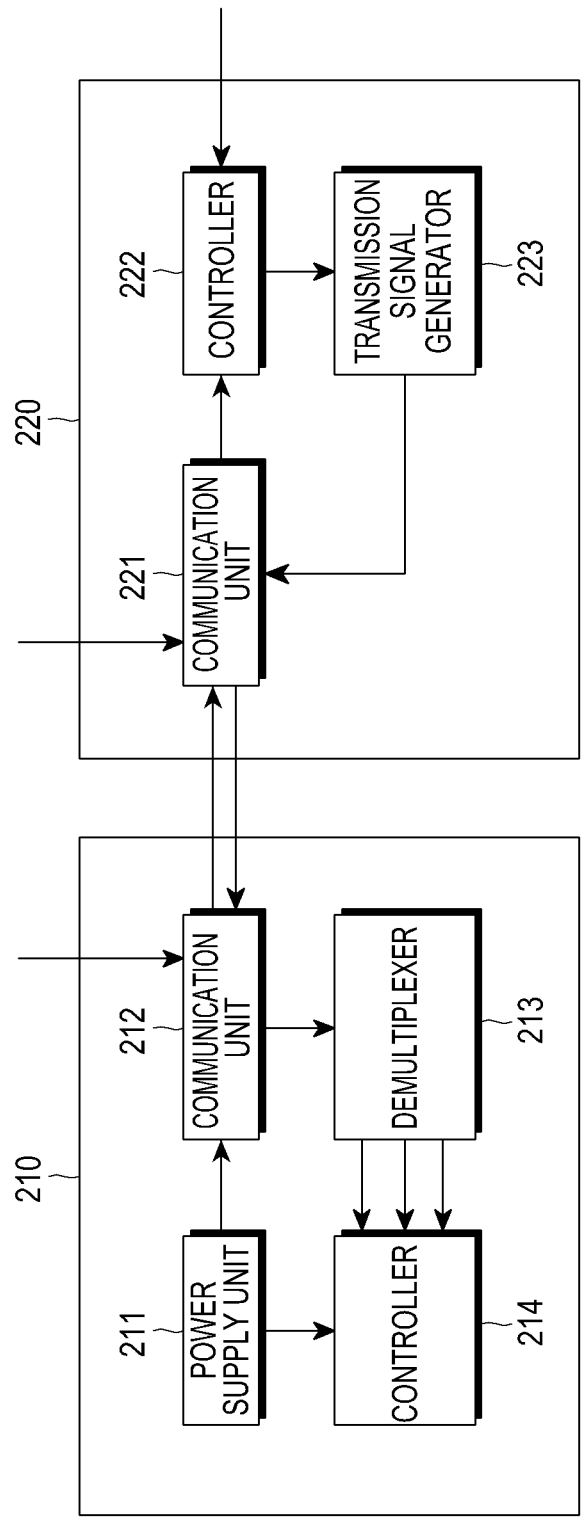
FIG. 2 is a block diagram illustrating a wireless power transmission/reception system, according to an embodiment of the present invention.

FIG. 2 is a block diagram illustrating a wireless power transmission/reception system, according to an embodiment of the present invention.

Referring to FIG. 2, the wireless power transmission/reception system includes a wireless power supplier 210 and a wireless power receiver 220. The wireless power supplier 210 includes a power supply unit 211, a communication unit 212, a demultiplexer 213, and a controller 214. The wireless power receiver 220 includes a communication unit 221, a controller 222, and a transmission signal generator 223.

The power supply unit 211 supplies power to the communication unit 212 so that the power is provided to the wireless power receiver 220 in a wireless scheme. The power supply unit 211 supplies power in the form of an Alternating Current (AC) wave, converts power of a Direct Current (DC) wave into an AC wave while supplying it, and supplies the power of the AC wave. The power supply unit 211 may be embodied as a battery as a power receiving interface to receive and supply external power to other structural elements. It will be understood by a person having ordinary skill in the art that a means capable of providing power of an AC wave is sufficient as the power supplier 211.

The communication unit 212 provides power input from the power supply unit 211 to the power receiver 220 in the form of an electromagnetic wave. The communication unit 212 may be embodied as a loop coil and accordingly transmits or receives a predetermined electromagnetic wave. When the communication unit 212 is embodied as a loop coil, inductance L of the loop coil may be changed, and accordingly, the communication unit 212 can transmit and receive electromagnetic waves of various frequencies. Further, the communication unit may be embodied as a plurality of loop coils, and the loop coils may receive a plurality of transmission signals from a plurality of wireless power receivers. It will be understood by a person having ordinary skill in the art that a means capable of transmitting and receiving an electromagnetic wave is sufficient as the communication unit 212.

As previously described, the communication unit 212 transmits power to the wireless power receiver 220 in the form of an electromagnetic wave, and receives a power communication signal from the wireless power receiver 220. When there are a plurality of wireless power receivers 220, a received signal may be received mixed with a power communication signal from respective wireless power receivers 220. Moreover, the power communication signal may include at least one of information associated with charging of the wireless power receiver 220 and a control signal of the wireless power supplier 210.

The communication unit 212 communicates with a communication unit 221 of the wireless power receiver 220 using, for example, Near Field Communication (NFC), Zigbee communication, infrared communication, or visible light communication. The communication unit 212 may communicate with a communication unit 221 of the wireless power receiver 220 based on a modulation/demodulation scheme of an Amplitude Shift Keying (ASK) scheme, a Phase Shift Keying (PSK) scheme, or a Frequency Shift Keying (FSK) scheme, as described in greater detail below.

The communication unit 212 receives a received signal mixing with at least one power communication signal from at least one wireless power receiver 220 and outputs the received signal to the demultiplexer 213.

The demultiplexer 213 demultiplexes and separates a received signal into at least one power communication signal. The demultiplexer 213 demultiplexes at least one power communication signal mixed in the received signal based on respective frequencies. At least one power communication signal demultiplexed by the demultiplexer 213 may be input to the controller 214.

The controller 214 controls supply of wireless power based on respective one or more power communication signals. Each of the power communication signals may include power receiving state information of each of the wireless power receivers 220, and the controller 214 controls the supply of the wireless power using the power receiving state information of each of the wireless power receivers 220.

For example, when charging of a first wireless power receiver is terminated, the controller 214 may control the power supply unit 211 to supply a reduced amount of wireless power less than a supplied amount of existing power. A configuration for controlling wireless power by the controller 214, is described in greater detail below. The controller 214 controls an overall operation of the wireless power supplier 210, and may be implemented in the form of a microprocessor or a mini computer, for example.

The communication unit 221 of the wireless power receiver 220 receives wireless power from the communication unit 212 of the wireless power supplier 210 in the form of an electromagnetic wave. The communication unit 221 may be embodied as a loop coil.

The communication unit 221 may receive not only a power transmission signal from the wireless power supplier 210, but also a power communication signal from another wireless power receiver. The wireless power receiver 220 may transmit a power communication signal containing state information of the wireless power receiver 220 or control information of the wireless power supplier 210. When there are a plurality of wireless power receivers, the wireless power receiver 220 may receive a power communication signal provided from another wireless power receiver. Accordingly, the communication unit 221 may receive a signal mixing with the power transmission signal from the wireless power supplier 210 and the power communication signal provided from another wireless power receiver.

The controller 222 measures amplitude or efficiency of wireless power supplied from the communication unit 221. The controller 222 creates transmission data including, for example, IDentifier (ID) information, power reception relation information, location information, environment setting information, safety relation information of the wireless power receiver 220, and control information of the wireless power supplier 210. The controller 222 controls an overall operation of the wireless power receiver 220, and may be embodied as a microprocessor or a mini computer, for example.

The transmission data may have a format of a message, a packet, or a frame with a fundamental structure of a header and a payload. The transmission data may be suited to Wireless Power Communication (WPC) standard protocol, and may be embodied as an ID packet, an environment setting packet, an error packet, a signal strength packet, or a termination power receiving packet. Moreover, the transmission data may be implemented by a packet in an in-band form including information not suited to the WPC standard protocol, such as, for example, location information, safety relation information, and control information of wireless power supplier, and information suited to the WPC standard protocol. The transmission data may be implemented by a packet in an out-band packet that separately transmits WPC standard suited information and non-suited information.

The control information of the wireless power supplier may include at least one of an applied voltage of the wireless power supplier 210, a frequency, and duty cycle control information of the power supply signal.

The controller 222 determines a transmission frequency transmitting a transmission signal of modulated transmission data. The controller 222 analyzes a signal received by the communication unit 221 to determine whether there is a communication signal of at least one preset scheme in the receive signal, in addition to a power supply signal from the wireless power supplier 210. The controller 222 determines a transmission frequency of the transmission signal so that it does not collide with that of a power communication signal of another wireless power receiver based on the determined result. A configuration for determining the transmission frequency will be described in detailed below.

The controller 222 outputs created transmission data and transmission frequency information to the transmission signal generator 223.

The transmission signal generator 223 generates a transmission signal including at least one of information on the wireless power receiver and control information of the wireless power supplier, based on the input transmission data. The transmission signal may be created in the form of a signal to be used by the communication unit 221.

The transmission signal generator 223 encodes input transmission data and then performs a primary sub-carrier modulation of the encoded transmission data. The transmission signal generator 223 performs a load modulation, namely, a secondary modulation of the sub-carrier modulated, or primarily modulated transmission data, so as to generate a transmission signal. The sub-carrier modulation, namely, primary modulation, may be performed at a relatively low frequency, such as, for example, in a several kHz band, and the load modulation, i.e., the second modulation, may be performed at a relatively high frequency, such as, for example, in a several MHz band. The embodiments of the present invention are not limited to the units used or the sequence of the modulation. A construction for generating the transmission signal is described in greater detail below.

The transmission signal generator 223 outputs the generated transmission signal to the communication unit 221, and the communication unit 221 transmits the transmission signal to the wireless power supply unit 210. Further, as previously described, the communication unit 221 transmits the transmission signal to another wireless power receiver.

As described above, a controller 222 of the wireless power receiver 220 determines whether a power communication signal is received from another wireless power receiver in addition to a power supply signal from the wireless power supplier 210. When the power communication signal is received from another wireless power receiver, the controller 222 determines a transmission frequency of a transmission signal transmitted from the wireless power receiver 220 that prevents frequency collision of simplex communication if there are a plurality of wireless power receivers.

Figure 3:
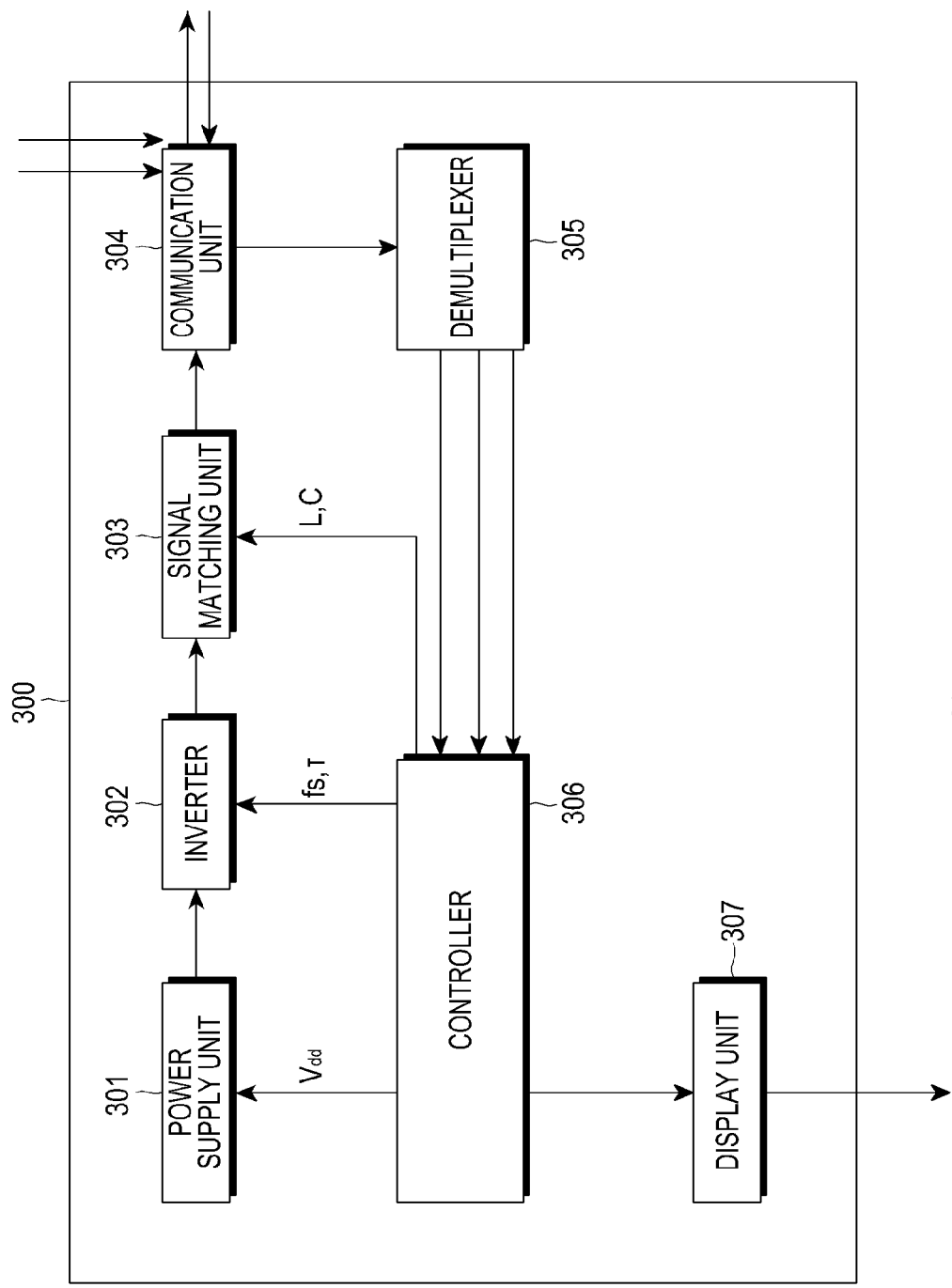
FIG. 3 is a block diagram illustrating a wireless power supplier, according to an embodiment of the present invention.

FIG. 3 is a block diagram illustrating a wireless power supplier, according to an embodiment of the present invention.

Referring to FIG. 3, a wireless power supplier 300 includes a Direct Current (DC) power supply unit 301, an inverter 302, a signal matching unit 303, a communication unit 304, a demultiplexer 305, a controller 306, and a display unit 307.

The DC power supply unit 301 provides power to be supplied to a wireless power receiver in the form of a direct current wave. The DC power supply unit 301 may be embodied as a battery providing direct current power. The DC power supply unit 391 may be implemented as a construction for receiving an external Alternating Current (AC) power and provides DC power through a predetermined conversion procedure. An applied voltage Vdd of the DC power supply unit 301 may be changed under the control of the controller 306.

The inverter 302 may convert DC power input from the DC power supply unit 301 into an AC wave. The inverter 302 may be embodied as a known inverter, and power frequency fs or a duty cycle $\tau$ of the inverter 302 may be changed under the control of the controller 306.

The signal matching unit 303 performs impedance matching for the AC power output from the inverter 302, with a communication unit 304 and a wireless power receiver electrically connected to the communication unit 304.

The communication unit 304 supplies impedance matched AC power to the wireless power receiver in the form of the electromagnetic wave. Further, the communication unit 304 receives a power communication signal including information of respective wireless power receivers or control information of the wireless power supplier 300 from at least one wireless power receiver. The communication unit 304 receives a received signal mixing with a power communication signal from at least one wireless power receiver.

The communication unit 304 may periodically or a periodically transmit a ping signal for driving the wireless power receiver.

The communication unit 304 outputs a received signal to the demultiplexer 305. The demultiplexer 305 demultiplexes a plurality of power communication signals including the received signal for each frequency.

The controller 306 demodulates and decodes a plurality of power communication signals. As previously described, the controller 306 demodulates the at least one power communication signal to the at least one power communication data in one of an ASK scheme, a PSK scheme, or an FSK scheme.

In an embodiment of FIG. 3, for example, the controller 306 performs demodulation based on the ASK scheme, and performs a first demodulation for demodulating at least one power communication signal according to a load demodulation scheme. For example, when a frequency of the power communication signal is 6.782, 6.784, or 6.786 MHz, a frequency of the power communication signal having been subjected to a first demodulation may be 2, 4, or 6 kHz, which are obtained by reducing 6.78 MHz from the original frequencies, respectively.

The controller 306 performs a second demodulation to mix a first demodulated power communication signal with a corresponding sub-carrier signal. In this case, the controller 306 includes a frequency synthesizer for oscillating a corresponding sub-carrier signal, and a mixer for mixing a corresponding sub-carrier signal with the first demodulated power communication signal. Each of the power communication signals contains information on a sub-carrier signal frequency. The controller 306 interprets respective power communication signals to oscillate a corresponding sub-carrier signal, such that the sub-carrier signal is mixed with respective power communication signals.

The controller 306 includes a decoder for decoding at least one second demodulated power communication signal. The decoder decodes the at least one second demodulated power communication signal in one of Non-Return to Zero (NRZ), Return to Zero (RZ), Manchester code, and bi-phase decoding schemes. In particular, in a case of a WPC standard, the decoder decodes the at least one second demodulated power communication signal to create at least one power communication data.

The controller 306 interprets power communication data to control a power supply of the wireless power supplier 300. As described above, the power communication data may include at least one of ID information of a wireless power receiver, power reception relation information of the wireless power receiver, location information of the wireless power receiver, environment setting information, safety relation information, and control information of the wireless power supplier. Further, control information of the wireless power supplier may include at least one of an applied voltage of the wireless power supply unit and frequency and duty cycle control information of the power supply signal.

For example, the controller 306 acquires information indicating that respective wireless power receivers cannot receive a supply of sufficient power from the power communication data, and accordingly increases a supplied amount of wireless power. The controller 306 directly increases an applied voltage Vdd of the DC power supply unit 301. Further, the controller 306 adjusts a power frequency fs or a duty cycle τ of the inverter 302 to increase the wireless power. The controller 306 adjusts an inductance L or a capacitance C of the signal matching unit 303.

As previously described, the power communication data includes control information of the wireless power supplier 300. The controller 306 directly controls the wireless power supplier 300 based on interpreted control information. For example, the power communication data may indicate increasing an applied voltage of the direct current power supply unit 301, and the controller 306 may interpret it to increase an applied voltage Vdd of the direct current power supply unit 301.

The controller 306 interprets power communication data to suitably control the supply of wireless power, and accordingly reflect a situation of the existing wireless power receiver around it to flexibly control supply of the wireless power.

The controller 306 determines whether frequency collision occurs between power communication signals. A plurality of wireless power receivers may simultaneously receive a ping signal, and frequency collision may occur. When the frequency collision occurs, the controller 306 controls the communication unit 304 to retransmit the ping signal and control a restart the entire procedure.

The controller 306 analyzes power communication data, creates graphic data for displaying it, and output the created graphic data to the display unit 307.

The display unit 307 outputs input graphic data such that the user may recognize it. A Liquid Crystal Display (LCD), or a Light Emitting Diode (LED) array may be used as the display unit 307. The display unit 307 may display power communication data, for example, an identifier by wireless power receivers and a corresponding charging state.

As described above, a wireless power supplier 300, according to an embodiment of the present invention, receives power communication signals for different frequencies from a plurality of wireless power receivers, and solve frequency collision problem. Accordingly, signal reception and interpretation times may be reduced.

Figure 4:
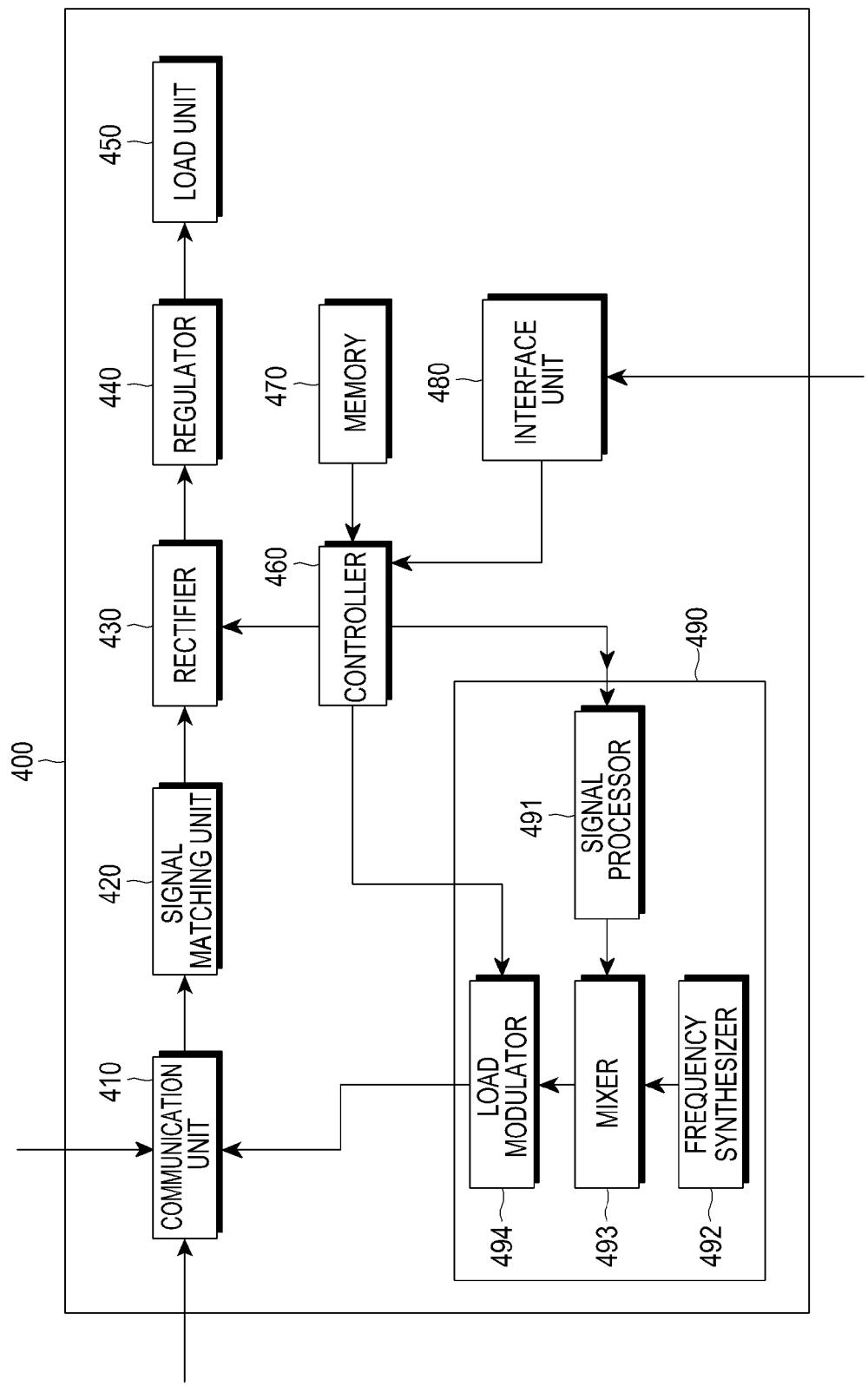
FIG. 4 is a block diagram illustrating a wireless power receiver, according to an embodiment of the present invention.

FIG. 4 is a block diagram illustrating a wireless power receiver 400, according to an embodiment of the present invention.

The wireless power receiver 400 includes a communication unit 410, a signal matching unit 420, a rectifier 430, a regulator 440, a load unit 450, a controller 460, a memory 470, an interface unit 480, and a transmission signal generator 490.

The communication unit 410 receives a power transmission signal from a wireless power supplier. The communication device 410 receives a power communication signal from another wireless power receiver. FIG. 4 illustrates that the communication unit 410 receives respective power transmission signals and power communication signals from the wireless power supplier and another wireless power receiver. However, the communication unit 410 may receive a signal that mixes a power transmission signal and at least one power communication signal.

The communication unit 410 receives a ping signal from a wireless power supplier. When the communication unit receives the ping signal, it starts driving using the energy of the ping signal.

The signal matching unit 420 performs impedance matching between structural elements electrically connected to the communication unit 410, such as, for example, the wireless power supplier or another wireless power receiver and the wireless power receiver 400.

The rectifier 430 rectifies a received signal of an AC wave to convert it into a received signal of a DC wave. The rectifier 430 may be embodied as a known rectifying means, such as, for example, a diode. It will be understood by a person having ordinary skill in the art that a means capable of performing rectification is sufficient as the rectifier 430.

The regulator 440 transfers a rectified received signal, namely, it supplies power to the load unit 450 with predetermined efficiency. The regulator 440 suitably adjusts a transfer rate of the power such that excessive voltage or current is not applied to the load unit 450 within a short time. Further, the regulator 440 reduces or increases a voltage or current of the received signal based on a voltage or current required by the load unit 450.

The load unit 450 is a means for actually using or storing power. When the wireless power receiver 400 is a portable phone or a smart phone, the load unit 405 may be embodied as a battery.

The controller 460 analyzes a received signal of a rectified DC wave to determine whether there is a power communication signal from another wireless power transmitter in the received signal, in addition to a power transmission signal from the wireless power supplier.

Figure 5:
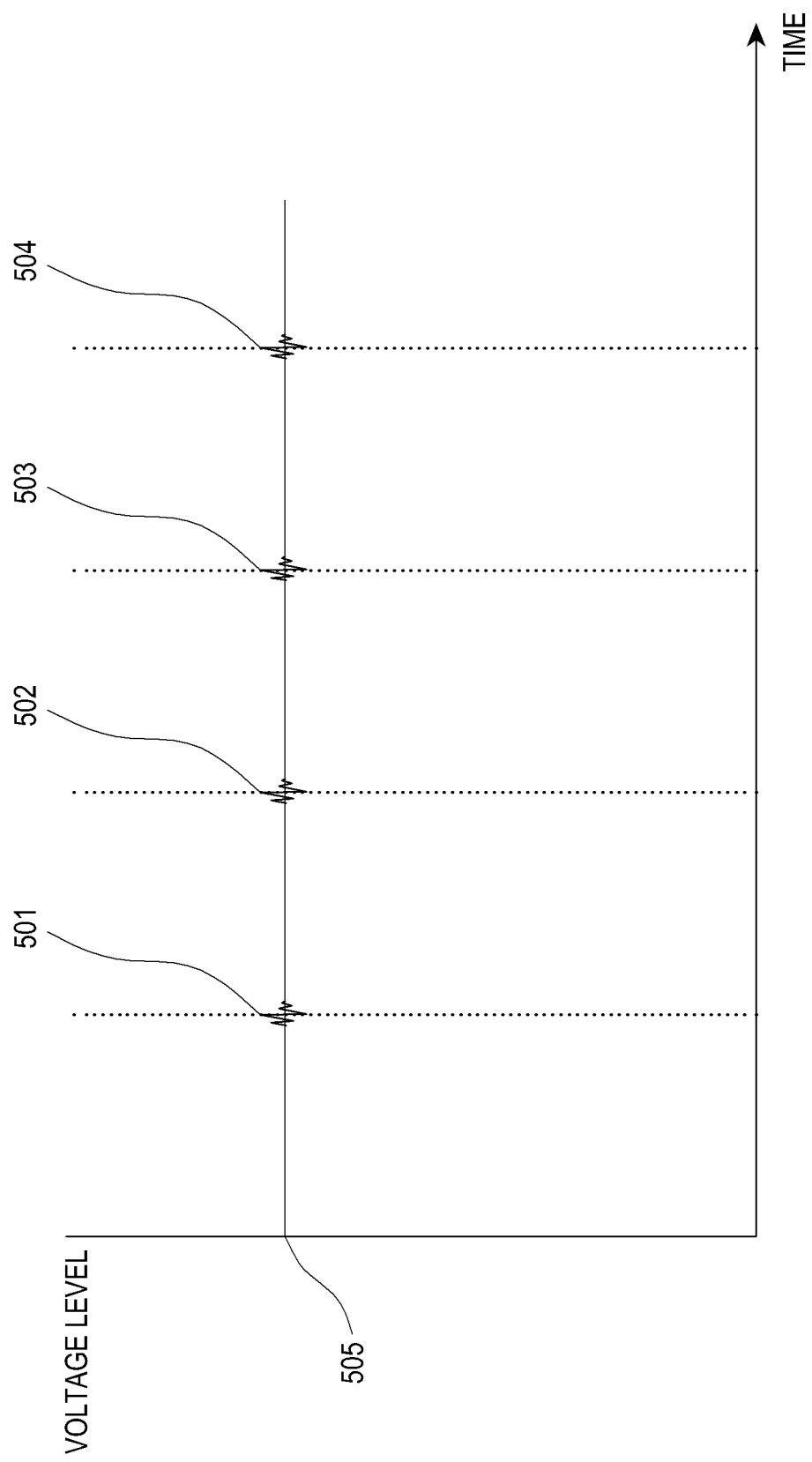
FIG. 5 is a diagram illustrating a determining procedure of a controller, according to an embodiment of the present invention.

FIG. 5 is a diagram illustrating a determining procedure of a controller, according to an embodiment of the present invention. As shown in FIG. 5, the rectified and received signal may have a predetermined voltage level 505. The voltage level 505 depends on a power supply signal from the wireless power supplier. It may be confirmed that specific waves 501, 502, 503, and 504 are present in a voltage level in a predetermined time period. These waves depend on a power communication signal from another wireless power receiver. As described above, the controller 460 analyzes a rectified reception signal wave to determine whether there is a power communication signal from another wireless power receiver, in addition to a power supply signal. When there is a power communication signal from another wireless power receiver, the power supply signal is power provided from the wireless power supplier to the wireless power receiver, and means only a carrier wave as described above.

Referring again to FIG. 4, the controller 460 determines a transmission frequency of a transmission signal according to a determination result of whether a power communication signal from another wireless power receiver is included in the received signal. The controller 460, according to an embodiment of the present invention, determines a sub-carrier signal frequency based on the determination result in order to determine a transmission frequency.

As illustrated in FIG. 2, the controller 460 performs two step modulations performing a load modulation after modulation of a sub-carrier signal. The controller changes a frequency of the sub-carrier signal to change a transmission frequency of a transmission signal.

For example, it is assumed that a frequency of a power supply signal from a wireless power supplier is 6.78 MHz. When a signal in addition to the power supply signal is detected from the received signal, i.e., when only a DC wave is detected, a frequency of the sub-carrier signal is determined to be 2 kHz. If one power communication signal in addition to the power supply signal is detected from the received signal, the controller 460 determines a frequency of the sub-carrier signal to be 4 kHz. When two power communication signals in addition to the power supply signal are detected from the received signal, the controller 460 determines a frequency of the sub-carrier signal to be 6 kHz. Table 1 is an example of relationship of an analysis result of a received signal, a frequency of a sub-carrier signal, and a frequency of a transmission signal, according to an embodiment of the present invention.

TABLE 1

| Analysis result of received signal | Frequency of sub-carrier signal | Frequency of transmission signal |
| --- | --- | --- |
| Detect only power supply signal | 2 kHz | 6.78 kHz |
| Detect power supply signal and one power communication signal | 4 kHz | 6.78 kHz |
| Detect power supply signal and two power communication signals | 6 kHz | 6.78 kHz |

As described above, the controller 460 determines the number of wireless power receivers existing at a periphery thereof, according to an analysis result of the received signal, and determines a corresponding frequency of a sub-carrier signal to prevent frequency collision although there are a plurality of wireless power receivers.

Figure 6:
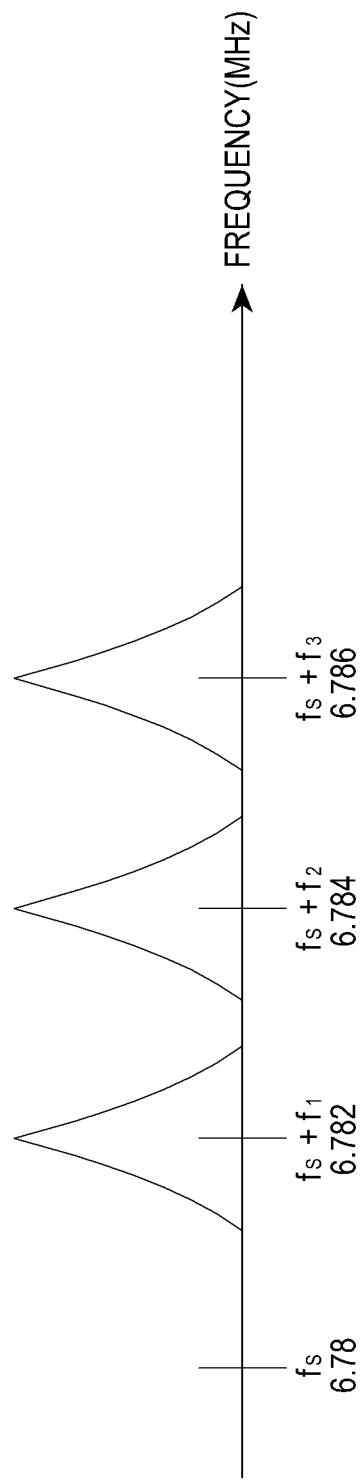
FIG. 6 is a waveform diagram illustrating transmission signal frequencies where only a power supply signal is detected, where a power supply signal and one power communication signal are detected, and where a power supply signal and two power communication signals are detected, according to an embodiment of the present invention.

FIG. 6 is a diagram illustrating transmission signal frequencies, according to an embodiment of the present invention. Specifically, FIG. 6 illustrates frequencies where only a power supply signal is detected (fs+f1), where a power supply signal and one power communication signal are detected (fs+f2), and where a power supply signal and two power communication signals are detected (fs+f3). More specifically, fs is a frequency by load modulation, and 6.78 MHz in the foregoing embodiment.

As illustrated in Table 1, a look-up table with respect to the relationship of a frequency of a sub-carrier signal and an analysis result of a received signal is stored in the memory 470. The controller 460 reads the look-up table from the memory 470 to determine a frequency of a transmission signal.

The memory 470 stores the look-up table. The memory 470 further stores an algorithm, a program, and an application required for an overall operation of a wireless power receiver. Further, the memory 470 stores an analysis result of the controller 460. The memory 470 may be a Non-Volatile Memory (NVM), such as a Solid State Disk (SSD), a flash memory card, or a Read Only Memory (ROM), or the memory 470 may be a volatile memory such as a Random Access Memory (RAM).

The interface unit 480 receives input of a charging control signal controlling charging for a terminal from the user. For example, the charging control signal indicates presence of fast charging or slow charging. The charging control signal input to the interface unit 480 is output to the controller 460, and the controller 460 creates transmission data based on the charging control signal.

The wireless power receiver 400 further includes a location information acquisition unit capable of acquiring location information. The location information acquisition unit creates a location information message based on detected location information, and outputs the created location information message to the controller 460. The location information message may be implemented by near field communication such as RF signal or Bluetooth signal communication. The location information acquisition unit determines a distance between the wireless power receiver 400 and a wireless power supplier using the RF signal. When the distance is less than a preset value, the location information acquisition unit determines that the terminal is chargeable. Further, the location information acquisition unit determines whether the terminal is chargeable based on a Bluetooth topology. The location information message is input to the controller 460, and the controller 460 creates transmission data using the location information message.

When transmitting the transmission signal, the controller 460 may have random delay, which prevents frequency collision when a plurality of wireless power receivers are simultaneously arranged.

The transmission signal generator 490 receives input of transmission data from the controller 460. The transmission signal generator 490 includes a signal processor 491, a frequency synthesizer 492, a mixer 493, and a load modulator 494.

The signal processor 491 encodes the input transmission data in a preset scheme. Although the signal processor 491 may encode the transmission data in one of NRZ, RZ, Manchester code, and bi-phase encoding schemes, it may encode the transmission data in a bi-phase encoding scheme for a WPA standard protocol.

The frequency synthesizer 492 oscillates a sub-carrier signal having a sub-carrier signal frequency determined by the controller 460. It will be understood by a person having ordinary skill in the art that a means capable of oscillating a signal with a predetermined frequency is sufficient as the frequency synthesizer 492.

The mixer 493 mixes the sub-carrier signal with the encoded transmission data to perform a primary modulation.

The load modulator 494 performs load modulation for the primary modulated signal as secondary modulation to create a transmission signal. The load modulator 494 may be embodied as a load and a switch, and performs secondary modulation for a signal based on on/off operation of the switch.

If the communication unit 410 receives the transmission signal from the load modulator 494, it transmits the transmission signal to the wireless power supplier. Because the communication unit 410 uses unilateral communication but does not have directionality, it transmits a transmission signal to wireless power receivers, other than the wireless power supplier, arranged at a periphery thereof.

Figure 7:
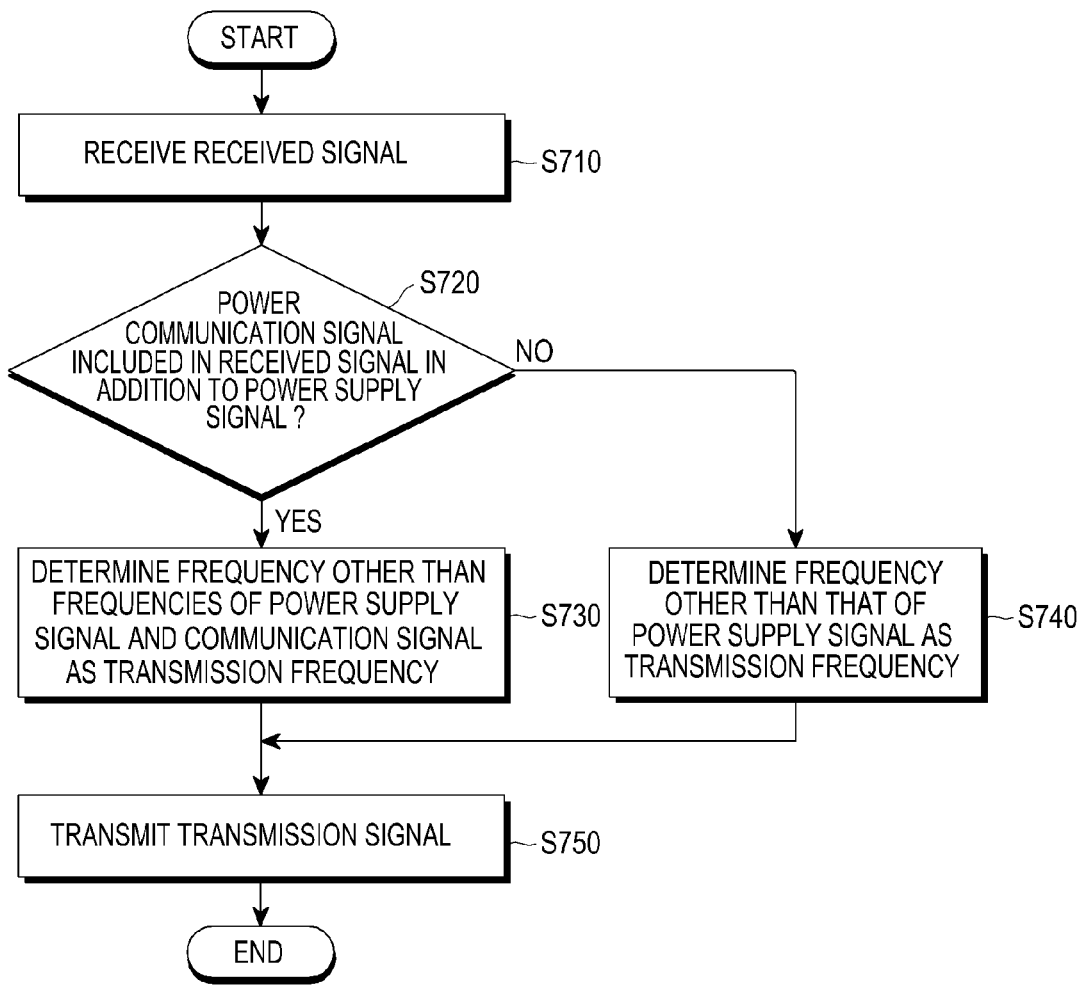
FIG. 7 is a flowchart illustrating a control method of a wireless power receiver, according to an embodiment of the present invention.

FIG. 7 is a flowchart illustrating a control method of a wireless power receiver, according to an embodiment of the present invention.

The wireless power receiver receives a signal, in step S710. The received signal may be a signal mixing a power supply signal and a power communication signal from at least one other wireless power receiver, or may be the power supply signal.

The wireless power receiver analyzes the received signal to determine whether a power communication signal is included in the received signal in addition to the power supply signal, in step S720.

When it is determined that the power communication signal is included in the received signal in step S720, the wireless power receiver determines the transmission frequency to be a frequency other than frequencies of the power supply signal and the communication signal, in step S730. When it is determined that the power communication signal is not included in the received signal in step S720, the wireless power receiver determines the transmission frequency to be a frequency other than that of the power supply signal, in step S740.

The wireless power receiver modulates transmission data with at least one of wireless power receiver information and control information of a wireless power supplier to a transmission signal of a transmission frequency, and transmits the transmission signal to the wireless power supplier or other peripheral wireless power receivers, in step S750.

The transmission data is modulated to the transmission signal in a modulation scheme, such as, for example, an ASK scheme, a PSK scheme, and an FSK scheme. In particular, when the modulation scheme is the ASK scheme, the step of determining the transmission frequency includes determining a sub-carrier frequency based on a determination result of the presence of a communication signal.

The step of modulating and outputting the transmission data to a transmission signal may include encoding the transmission data, oscillating a sub-carrier signal having a sub-carrier frequency, a first modulation step of mixing the encoded transmission data with the sub-carrier signal, and a second modulation step of modulating the first modulated transmission signal in a load modulation scheme.

The step of encoding the transmission data may include encoding the transmission data in one of NRZ, RZ, Manchester code, and bi-phase encoding schemes.

A method for controlling a wireless power receiver may further include a step of rectifying a received signal after receiving input of the received signal.

The transmission data may contain at least one of ID information, power reception relation information, location information of a wireless power receiver, environment setting information, safety relation information, and control information of a wireless power supplier. The control information of a wireless power receiver may contain at least one of applied voltage of the wireless power supplier, and frequency and duty cycle control information of a power supply signal.

The method for controlling a wireless power receiver may further include a step of detecting reception of a ping signal from a wireless power supplier before receiving input of the received signal, and a step of driving the wireless power receiver when the reception of the ping signal is detected.

The transmission frequency may be determined based on the number of at least one external wireless power receivers for analyzing and determining the received signal.

Figure 8:
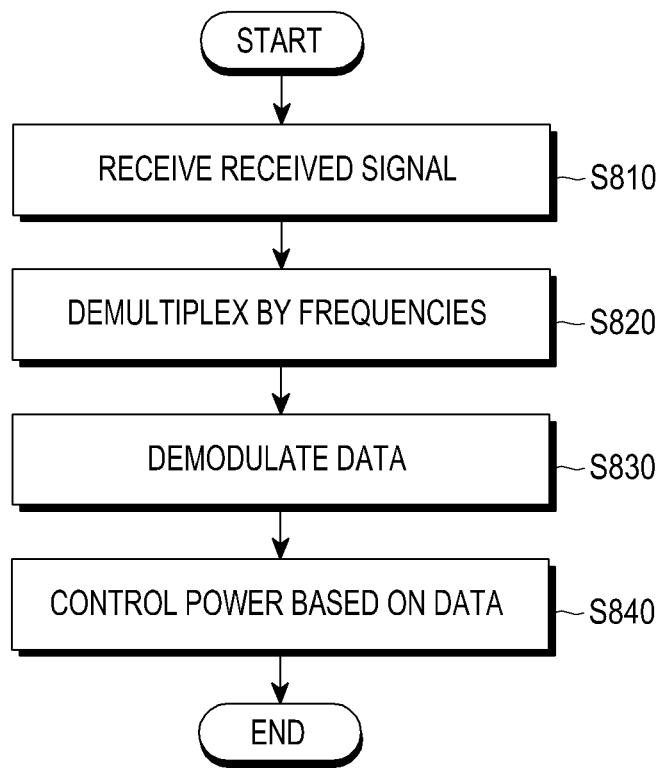
FIG. 8 is a flowchart illustrating a control method of a power supplier, according to an embodiment of the present invention.

FIG. 8 is a flowchart illustrating a control method of a power supplier, according to an embodiment of the present invention.

A wireless power supplier receives a signal having at least one power communication signal with a frequency different from at least one wireless power receiver, in step S810.

The wireless power supplier demultiplexes the received signal to the at least one power communication signal with the different frequency, in step S820.

The wireless power supplier demodulates the at least one power communication signal to power communication data, in step S830. The wireless power supplier interprets the communication data to control a supply of wireless power, in step (S840).

The step of demodulating the at least one power communication signal to power communication data may include demodulating the at least one power communication signal to the power communication data in one of an ASK scheme, a PSK scheme, or an FSK scheme. In particular, when the demodulation scheme is the ASK scheme, the step of demodulating the at least one power communication signal may include a first demodulation step of demodulating the at least one power communication signal in a load demodulation scheme, a second demodulating step for mixing the first at least one demodulated power communication signal with respective corresponding sub-carrier signals, and a step of decoding the second at least one modulated power communication signal.

The step of demodulating the at least one power communication signal may include decoding the at least one communication signal in one of NRZ, RZ, Manchester code, and bi-phase encoding schemes.

Communication data may contain at least one of ID information, power reception relation information, location information of a wireless power receiver, environment setting information, safety relation information, and control information of a wireless power supplier. The control information of a wireless power receiver may contain at least one of an applied voltage of the wireless power supplier, and a frequency and duty cycle control information of a power supply signal.

The method for controlling the wireless power supplier may further include transmitting a ping signal for driving at least one wireless power receiver before receiving input of the received signal.

The method for controlling the wireless power supplier may further include determining whether frequency collision occurs among respective power communication signals after demultiplexing to at least one power communication signal, and restarting an entire procedure when the frequency collision occurs.

In various embodiments of the present invention, when a plurality of wireless power receivers transmit a transmission signal to a single wireless power supplier, a frequency collision problem may be solved using different frequencies.

In addition, because a plurality of wireless power receivers use a frequency division scheme for simultaneously transmitting transmission signals by using different frequencies, embodiments of the present invention may transmit/receive the transmission signals at a higher speed when compared to a time division scheme.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of transmitting a signal from a wireless power receiver, the method comprising the steps of:
receiving a signal comprising at least one of a power supply signal for wireless charging from a wireless power supplier and a power communication signal from at least one external wireless power receiver;
analyzing the received signal to determine whether the power communication signal is included with the power supply signal in the received signal;
determining a transmission frequency of a transmission signal based on whether the power communication signal is included with the power supply signal in the received signal; and
modulating transmission data for control of the wireless charging, and outputting the modulated transmission data as the transmission signal over the transmission frequency.

2. The method of claim 1, wherein determining the transmission frequency of the transmission signal comprises determining the transmission frequency as a frequency that differs from frequencies of the power supply signal and the power communication signal, when the power communication signal is included with the power supply signal in the received signal.

3. The method of claim 1, wherein determining the transmission frequency of the transmission signal comprises determining the transmission frequency as a frequency that differs from a frequency of the power supply signal, when the power communication signal is not included with the power supply signal in the received signal.

4. The method of claim 1, wherein modulating the transmission data comprises modulating the transmission data to the transmission signal in one of an Amplitude Shift Keying (ASK) scheme and a Phase Shift Keying (PSK) scheme.

5. The method of claim 4, wherein, when the transmission data is modulated using the ASK scheme, determining the transmission frequency comprises determining a sub-carrier frequency based on whether the power communication signal is included with the power supply signal in the received signal.

6. The method of claim 5, wherein modulating the transmission data comprises:
encoding the transmission data;
oscillating a sub-carrier signal with the sub-carrier frequency;
mixing the encoded transmission data with the sub-carrier signal; and
modulating the mixed transmission signal in a load modulation scheme.

7. The method of claim 6, wherein encoding the transmission data comprises ending the transmission data in one of a Non-Return to Zero (NRZ) scheme, a Return to Zero (RZ) scheme, a Manchester code scheme, and a bi-phase decoding scheme.

8. The method of claim 1, further comprising rectifying the received signal after receiving the signal.

9. The method of claim 1, wherein the transmission data comprises at least one of IDentifier (ID) information, power reception relation information, location information of the wireless power receiver, environment setting information, safety relation information, and control information of the wireless power supplier.

10. The method of claim 9, wherein the control information of the wireless power receiver comprises at least one of an applied voltage of the wireless power supplier, and frequency and duty cycle control information of the power supply signal.

11. The method of claim 1, further comprising:
detecting reception of a ping signal from the wireless power supplier before receiving the signal; and
driving the wireless power receiver when the reception of the ping signal is detected.

12. The method of claim 1, wherein the transmission frequency is determined based on a number of the at least one external wireless power receiver.

13. A wireless power receiver comprising:
a communication unit for receiving a signal comprising at least one of a power supply signal for wireless charging from a wireless power supplier and a power communication signal from at least one external wireless power receiver;
a controller for analyzing the received signal to determine whether the power communication signal is included with the power supply signal in the received signal, and determining a transmission frequency of a transmission signal based on whether the power communication signal is included with the power supply signal in the received signal; and
a transmission signal generator for modulating transmission data for control of the wireless charging and outputting the modulated transmission data as the transmission signal for the transmission frequency to the communication unit,
wherein the controller controls the communication unit to transmit the transmission signal.

14. The wireless power receiver of claim 13, wherein the controller determines the transmission frequency as a frequency that differs from frequencies of the power supply signal and the power communication signal, when the power communication signal is included with the power supply signal in the received signal.

15. The wireless power receiver of claim 13, wherein the controller determines the transmission frequency as a frequency that differs from a frequency of the power supply signal, when the power communication signal is not included with the power supply signal in the received signal.

16. The wireless power receiver of claim 13, wherein the transmission signal generator modulates the transmission data to the transmission signal in one of an Amplitude Shift Keying (ASK) scheme and a Phase Shift Keying (PSK) scheme.

17. The wireless power receiver of claim 16, wherein, when the transmission data is modulated using the ASK scheme, the controller determines a sub-carrier frequency based on whether the power communication signal is included with the power supply signal in the received signal.

18. The wireless power receiver of claim 17, wherein the transmission signal generator comprises:
a signal processor for encoding the transmission data;
a frequency synthesizer for oscillating a sub-carrier signal with the sub-carrier frequency;
a mixer for mixing the encoded transmission data with the sub-carrier signal; and
a load modulator for modulating the mixed transmission signal in a load modulation scheme.

* * * * *